United States Patent [19]

Misra

[11] Patent Number: 5,275,800
[45] Date of Patent: Jan. 4, 1994

[54] CRYSTALLINE ZEOLITES AND METHOD OF PREPARATION FROM AMORPHOUS SILICA PARTICLES

[75] Inventor: Chanakya Misra, Pittsburgh, Pa.

[73] Assignee: Aluminum Company of America, Pittsburgh, Pa.

[21] Appl. No.: 998,828

[22] Filed: Dec. 30, 1992

[51] Int. Cl.$^5$ .............................................. C01B 33/34
[52] U.S. Cl. .................. 423/710; 423/328.2; 423/329.1; 423/330.1; 423/718
[58] Field of Search .............. 423/710, 718, 328.2, 423/329.1, 330.1

[56] References Cited

U.S. PATENT DOCUMENTS

| | | | |
|---|---|---|---|
| 3,436,174 | 4/1969 | Sand | 23/113 |
| 3,574,539 | 4/1971 | Domine et al. | 23/112 |
| 3,702,886 | 11/1972 | Argauer et al. | 423/328 |
| 3,867,512 | 2/1975 | Young | 423/710 |
| 3,920,798 | 11/1975 | Weber | 423/710 |
| 4,081,514 | 3/1978 | Sand et al. | 423/328 |
| 4,557,918 | 12/1985 | Lagerström et al. | 423/335 |

Primary Examiner—Asok Pal
Attorney, Agent, or Firm—Glenn E. Klepac

[57] ABSTRACT

Zeolite is synthesized by reacting amorphous silica particles with NaOH and $Al_2O_3$ under hydrothermal reaction conditions. The amorphous silica particles are preferably produced by reaction of fluosilicic acid and alumina to form aluminum fluoride and silica. The silica particles contain some residual fluorine and aluminum, and their surface area is about 1 to 3 $m^2/g$. Mordenite and ZSM-5 zeolites are obtained in preferred embodiments of the invention.

17 Claims, 1 Drawing Sheet

CRYSTALLINE ZEOLITES AND METHOD OF PREPARATION FROM AMORPHOUS SILICA PARTICLES

FIELD OF THE INVENTION

The present invention relates to zeolites and methods for their preparation. The preferred method provides amorphous silica particles in a hydrothermal reaction mixture comprising $SiO_2$, NaOH and $Al_2O_3$. The products are useful as adsorbents, catalysts, fillers and pigments.

BACKGROUND OF THE INVENTION

Aluminosilicate zeolites are microporous crystalline solids containing cavities and channels of molecular dimensions. These cavities and channels are precisely uniform in size. Since the dimensions of these pores are such that they can accept molecules of certain size while rejecting molecules of larger dimensions, these materials have come to be widely known as "molecular sieves." This property has been utilized in a variety of ways for adsorption, catalysis, ion exchange, purifications and separations.

The primary building block of the zeolite structure is a tetrahedron of four oxygen atoms surrounding a central silicon atom $(SiO_4)^{4-}$. These tetrahedra are connected through shared oxygen atoms to form a wide range of secondary building units. Different combinations of the secondary building units give rise to numerous distinctive zeolite framework structures with varying pore sizes. In aluminosilicate zeolites, some of the $Si^{4+}$ atoms are substituted by $Al^{3+}$ atoms, and this results in a single net negative charge on the framework which is compensated by a nonframework cation (e.g., $Na^+$) that is located in the pores or cavities of the structure. These charge compensating cations are relatively mobile and can, in many cases, be easily exchanged for other cations.

Although naturally occurring zeolites of the "molecular sieve" type were known to mineralogists for many years, the art of synthesizing such materials is relatively recent. Prior art techniques for synthesis, described in patents and open technical literature, have been used in the preparation of a variety of commercially important crystalline aluminosilicate zeolite materials. A representative list of such products and relevant patents is shown in Table 1. Numerous other patents exist on the synthesis of various zeolite products possessing other structures and compositions.

In the context of the present invention, mordenites and the ZSM-5 series of high Si:Al ratio aluminosilicates are of particular significance. These materials have been widely used as catalysts in organic synthesis. Important examples of their uses include the conversion of methanol to gasoline, the dewaxing of distillates and the interconversion of aromatic compounds. The high Si:Al ratio has been shown to result in hydrophobicity leading to potential applications in the separation of hydrocarbons from polar compounds (e.g., water and alcohols).

Natural mordenite is the most siliceous natural zeolite with a 10:1 $SiO_2/Al_2O_3$ ratio (Formula: $Na_2O \bullet Al_2O_3 \bullet 10SiO_2 \bullet 6H_2O$). The framework structure consists of 12- and 8-membered rings formed with 5-membered silica tetrahedron rings. The high degree of thermal stability of mordenite has been attributed to the presence of the 5-membered rings which are energetically favored in terms of stability. A two-dimensional channel system is created by the 8-membered ring system whose dimensions ($2.6 \times 5.7$ Å, perpendicular to the b axis) allow the diffusion of small molecules. The 12-membered ring system (perpendicular to the c axis) creates a one-dimensional channel with a dimension of 6.7 Å. In natural mordenite, diffusion blocks produced by stacking faults or by the presence of cations and amorphous material tend to restrict the kinetic diameter of diffusing molecules to only about 3.9 Å. Because this channel system is only in one direction, the number of diffusion blocks needed to restrict the diffusion of large molecules is not large.

On the other hand, synthetic "large port" mordenite exhibits the adsorption characteristics expected for the free diffusion of molecules in the large 6.7 Å diameter channels. The defects and the extraneous matter which are assumed to block the main channels in the natural mineral are apparently not present in the synthetic product.

The ZSM-5 zeolite is normally synthesized by including organic molecules such as tetrapropyl ammonium bromide in the reaction mixture. These organic molecules have been described as functioning as "templates" or "directing agents" around which the zeolite crystallizes. Typical compositions of the reaction mixture and synthesis conditions are given in U.S. Pat. No. 3,702,886. The organic guest molecule is incorporated into the zeolite structure as it is formed. The zeolite may be freed of the organic guest molecule by high temperature treatment without changing its framework topology.

TABLE 1

Examples of Commercially Available Natural and Synthetic Zeolites

| | Zeolite | Natural/ Synthetic | No. of Tetrahedra in Largest Ring | Si:Al | Cation | Pore Size Å | U.S. Pat. No. |
|---|---|---|---|---|---|---|---|
| 1 | Erionite | Nat | 8 | 3 | Variable (Na, K, Ca, Mg) | 3.6 | |
| 2 | Mordenite | Nat | 12 | 5 | Variable (Na, K, Ca) | 3.9 | |
| 3 | Chabazite | Nat | 8 | 2 | Na, K, Mg | 3.9 | |
| 4 | A | Syn | 8 | 1.0 | K, Na, Ca | 3–4.5 | 2,882,243 |
| 5 | X (Faujasite) | Syn | 12 | 1–1.5 | Na | 7.4 | 2,882,244 |
| 6 | Y (Faujasite) | Syn | 12 | 1.5–3 | Na | 7.4 | 3,130,007 |
| 7 | Ferrierite | Syn | 10 | 5 | Na, K, Mg | 5.5 | 3,966,883 |
| 8 | Mordenite (LP) | Syn | 12 | 5 | Na | 6.7 | 3,436,174 |
| 9 | ZSM-5 | Syn | 10 | 10–500 | Na, H | 5.5 | 3,702,886 |

The aluminum content of ZSM-5 type zeolites can be changed by several orders of magnitude with silicon contents approaching substantially pure silica without altering the basic framework configuration.

The framework of ZSM-5 zeolite contains a novel configuration of linked silicon tetrahedra. The channel system is three-dimensional and defined by 10-member rings of tetrahedra consisting of straight and sinusoidal channels with a dimension of 5.5 Å.

The products of the present invention, although structurally similar to mordenite and ZSM-5 (as shown by the X-ray diffraction patterns), may be considered as a different class of high silica zeolites because they do not contain the organic "template molecules" and have not been "dealuminized" subsequent to their synthesis.

It is a principal objective of the present invention to provide a method for producing novel crystalline zeolites utilizing an amorphous silica powder that is obtained by neutralization of fluosilicic acid with alumina.

It is a related advantage of the claimed method that the novel high silica zeolites may be prepared without organic template molecules and without being dealuminized subsequent to their synthesis.

Additional objectives and advantages of the present invention will become readily apparent to persons skilled in the art from the following detailed description.

SUMMARY OF THE INVENTION

In accordance with the present invention, there is provided a method for making crystalline zeolite. A hydrothermal reaction mixture comprising amorphous silica particles, NaOH and $Al_2O_3$ is reacted under hydrothermal reaction conditions to produce zeolite which is then washed and dried to produce crystalline zeolite particles.

The silica particles in the reaction mixture are preferably produced by reaction of fluosilicic acid and alumina to form aluminum fluoride and silica. Accordingly, the silica particles generally contain some residual fluorine and aluminum. The fluorine content is about 0.2 to 5 wt. % and usually about 1 to 2 wt. %. Aluminum content (expressed as $Al_2O_3$) is about 0.2 to 5 wt. %. The silica particles have an average particle size of about 5 to 30 microns, more preferably less than about 10 microns. Surface area of the silica particles is usually only about 1 to 3 m²/g.

The reaction mixture generally comprises about 0.1 to 0.6 mole NaOH per mole of silica and up to about 0.05 mole $Al_2O_3$ per mole of silica. When it is desired to produce mordenite, the $Al_2O_3$ content should be about 0.02 to 0.03 mole per silica mole. The reaction mixture may also contain about 15 to 35 mols water.

The reaction mixture is reacted at temperatures of about 140° to 250° C., preferably about 175° to 225° C. An autogenous pressure of about 50 to 360 psig is obtained, preferably about 200 to 320 psig.

The method of the invention has been utilized to produce both mordenite and ZSM-5 forms of zeolite, as determined by X-ray diffraction patterns.

DETAILED DESCRIPTION OF THE PREFERRED EMBODIMENTS

Figure 1:
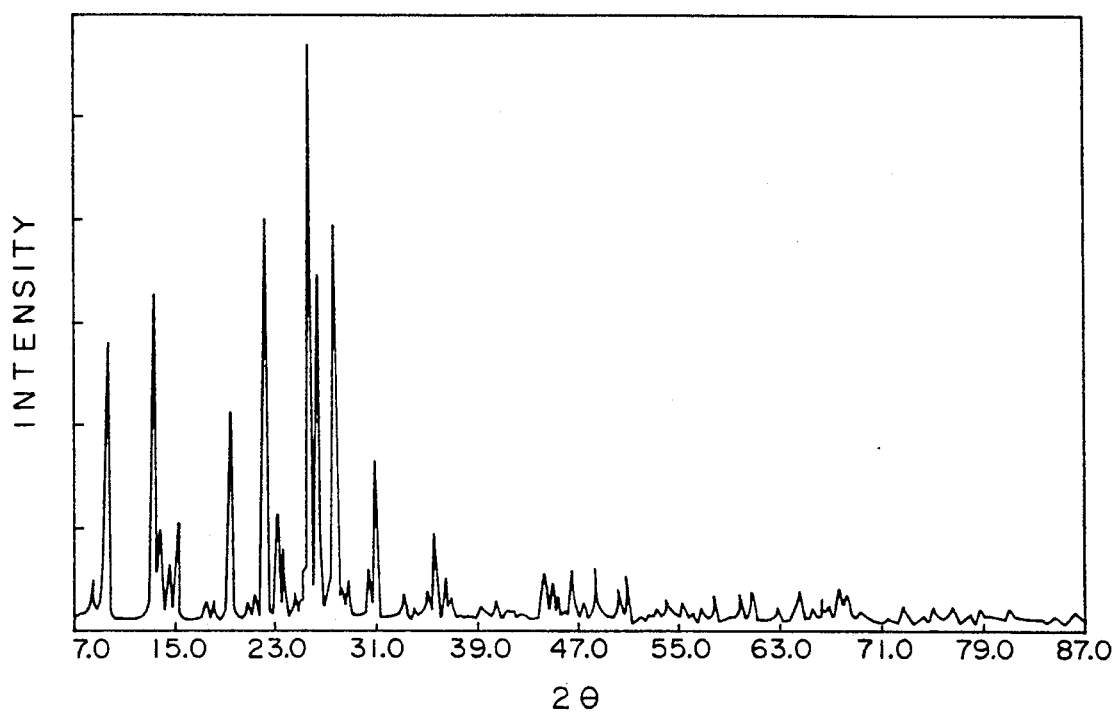
FIG. 1 is an X-ray diffraction pattern of mordenite produced by the method of the invention.

Zeolites of the present invention are synthesized from a specific type of amorphous silica which is obtained by neutralization of fluosilicic acid ($H_2SiF_6$) with alumina ($Al_2O_3$) to produce aluminum fluoride and silica. A commercially available silica of this type is "Alcoa Silica" produced by Aluminum Company of America of Pittsburgh, Pa. This silica product is a fine, amorphous powder with the chemical composition shown in Table 2.

TABLE 2

| Chemical Composition of Alcoa Silica | |
|---|---|
| | wt. % |
| $SiO_2$, Anhydrous Basis | >95 |
| Moisture, 105° C. | 1.5 |
| Weight Loss, 105–1000° C. | 5.1 |
| F | <5.0 |
| $Al_2O_3$ | <5.0 |
| $Fe_2O_3$ | <0.04 |
| $K_2O$ | <0.01 |
| CaO | <0.01 |
| MgO | <0.01 |

The chemical composition of a typical sample of the silica is shown below.

TABLE 3

| Typical Chemical Composition | |
|---|---|
| | wt. % |
| $SiO_2$, Anhydrous Basis | 98+ |
| F | 1.46 |
| $Al_2O_3$ | 0.13 |
| $Fe_2O_3$ | 0.04 |
| $Na_2O$ | 0.01 |
| $K_2O$ | 0.01 |
| CaO | 0.01 |
| MgO | 0.01 |
| $TiO_2$ | 0.01 |
| Pb | <0.4 ppm |
| Hg | <0.1 ppm |
| As | 4.4 ppm |

The silica product is normally available in the particle size range of about 5 to 30 μm. For zeolite synthesis, it may be utilized as such or, preferably after being ground to a particle size of less than about 10 μm.

Synthesis is carried out by reacting the silica powder with an aqueous solution of sodium hydroxide. Alumina (in addition to that available in the silica) is added to this reaction mixture in the form of alumina hydrate (such as gibbsite, bayerite, nordstrandite, boehmite and pseudoboehmite) or as sodium aluminate. As used herein, the term "alumina hydrate" refers to $Al_2O_3 \cdot xH_2O$ wherein x varies from 1 to 3.

The molar proportion of components in the reaction mixture is typically maintained in the following range:

| Component | Moles/mole $SiO_2$ |
|---|---|
| $SiO_2$ | 1.0 |
| Total Caustic (as $Na_2O$)* | 0.10–0.25 |
| $Al_2O_3$** | 0.01–0.05 |
| $H_2O$ | 15–25 |

*Includes $Na_2O$ part of sodium aluminate if used.
**Includes $Al_2O_3$ present in silica used.

The reaction is carried out hydrothermally. The reaction mixture is taken in a closed, agitated autoclave and heated under autogenous pressure to 150° to 250° C. for periods of 6 to 48 hours. At the end of the reaction period, the autoclave is cooled to below 100° C. and discharged. The solid zeolite is filtered, washed with hot deionized water to remove all adhering caustic liquor and dried.

The product recovery corresponds to >90% of the amount of silica and alumina used. The following examples illustrate the practice of this synthesis procedure and some characteristics of the products. The examples are illustrative only and should not be considered limiting in any way.

EXAMPLE 1

Twelve liters of deionized water are taken in an 18-liter capacity nickel autoclave. The autoclave has provision for agitation and electrical heating. 498 grams of technical grade sodium hydroxide pellets are then added to the autoclave with stirring; 2300 g of amorphous silica (previously ground to $-10$ $\mu$m size) and 140 g of alumina hydrate (gibbsite, obtained as Alcoa C-31 hydrate) are then added to the caustic solution. The autoclave is closed and heated to 200° C. The heating period is approximately 1½ hour, and the autogenous pressure developed at 200° C. is 265 psig. The contents are kept agitated under these conditions for a period of 12 hours. At the end of this period, the heater is switched off and the autoclave is allowed to cool to room temperature while keeping the agitator operating. The autoclave is then discharged and the solid product separated by filtration. The product is displacement washed several times by passing hot deionized water through the filter cake. The product is then dried at 120° C. for 12 hours. Product weight is 1940 g.

The X-ray diffraction pattern of the dried powder is shown in FIG. 1. It closely matches the X-ray diffraction pattern of large port mordenite reported by Sand et al. (Ref: M. L. Sand, W. S. Colblenz, L. B. Sand, "Molecular Sieve Zeolites," Adv. in Chem. Ser. 101, American Chemical Society, Washington, D.C., 1971, p. 127).

The chemical composition of the product is as follows:

|  | wt. % |  |
| --- | --- | --- |
| $Al_2O_3$ | 7.81 | anhydrous basis |
| $Na_2O$ | 4.22 | |
| $SiO_2$ | 88.30 | |
| Loss on ignition to 1000° C. | 6.1 | |
| Molar ratio $SiO_2/Al_2O_3$ | 19.2 | |

Important physical properties determined are:

| Real density determined by He displacement | 2.1 g/cm$^3$ |
| --- | --- |
| Specific surface area determined by $N_2$ (BET) adsorption | 220 m$^2$/g |
| Pore volume determined by $N_2$ adsorption method | 0.12 cm$^3$/g |

EXAMPLE 2

Figure 2:
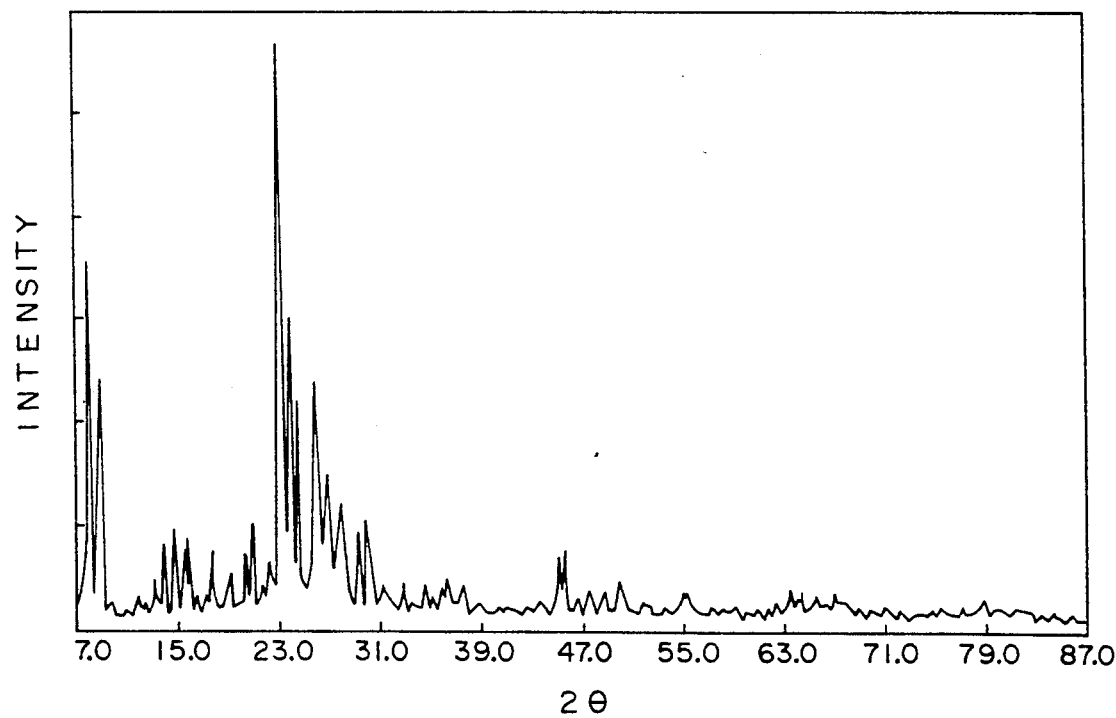
FIG. 2 is an X-ray diffraction pattern of ZSM-5 zeolite produced by the method of the invention.

The procedure described in Example 1 is followed but no alumina hydrate is added, and the autoclave is maintained at 200° C. for a period of 6 hours. The product weight was 1825 g. The X-ray diffraction pattern of the product is shown in FIG. 2. It closely matches the X-ray diffraction pattern of ZSM-5 zeolite reported by R. J. Argauer and G. R. Landolt in U.S. Pat. No. 3,702,886, issued Nov. 14, 1972.

The chemical composition and physical properties of the product are as follows:

|  | wt. % |  |
| --- | --- | --- |
| $Al_2O_3$ | 3.78 | anhydrous basis |
| $Na_2O$ | 3.91 | |
| $SiO_2$ | 93.0 | |
| LOI (1000° C.) | 6.2 | |
| Molar $SiO_2/Al_2O_3$ ratio | 41.8 | |
| He density | | 2.2 g/cm$^3$ |
| BET ($N_2$) specific surface area | | 230 m$^2$/g |
| Pore volume | | 0.145 cm$^3$/g |

The silica particles utilized in Example 2 contained sufficient alumina to form zeolite, without addition of alumina to the reaction mixture. When the silica particles contain less alumina as in the Table 3 analysis, alumina must be added to the reaction mixture.

Having thus described the invention, what is claimed is:

1. A method of making zeolite comprising:
   (a) providing a hydrothermal reaction mixture comprising $SiO_2$, NaOH and $Al_2O_3$ in the following proportions:
      (i) about 1 mole $SiO_2$ comprising amorphous silica particles produced by reaction of fluosilicic acid and alumina,
      (ii) about 0.1-0.6 mole NaOH, and
      (iii) up to about 0.05 mole $Al_2O_3$; and
   (b) reacting said $SiO_2$, NaOH and $Al_2O_3$ in the reaction mixture under hydrothermal reaction conditions comprising temperatures of about 140° to 250° C. and pressures of about 50 to 360 psig without any organic template for a sufficient time to produce zeolite.

2. The method of claim 1 further comprising
   (c) washing and drying said zeolite.

3. The method of claim 1 wherein said hydrothermal reaction conditions comprise temperatures of about 175° to 225° C. and pressures of about 200 to 320 psig.

4. The method of claim 1 wherein step (b) comprises reacting said reaction mixture for about 3 to 48 hours at about 200° C.

5. The method of claim 1 wherein said silica particles contain about 0.2 to 5 wt. % fluorine.

6. The method of claim 1 wherein said silica particles contain about 1 to 2 wt. % fluorine.

7. The method of claim 1 wherein said silica particles contain about 0.2 to 5 wt. % $Al_2O_3$.

8. The method of claim 1 wherein said silica particles have an average particle size of about 5 to 30 microns.

9. The method of claim 1 wherein said silica particles have an average particle size of less than about 10 microns.

10. The method of claim 1 wherein said silica particles have a surface area of about 1 to 3 m$^2$/g.

11. A method of making zeolite comprising:
    (a) providing a hydrothermal reaction mixture consisting essentially of:
       (i) amorphous silica particles produced by reacting fluosilicic acid and alumina, said silica particles containing at least about 0.2 wt. % fluorine;
       (ii) sodium hydroxide; and
       (iii) alumina hydrate;
    (b) reacting said reaction mixture under hydrothermal reaction conditions at 175°-225° C. for a sufficient time to produce zeolite; and
    (c) recovering said zeolite.

12. The method of claim 11 wherein said reacting of step (b) is carried out for about 12 hours.

13. The method of claim 11 wherein said reacting of step (b) is carried out for about 6 hours.

14. The method of claim 11 wherein step (b) is carried out without adding an organic template to said reaction mixture.

15. The method of claim 11 wherein said reaction mixture consists essentially of about 1 mole $SiO_2$, about 0.1–0.6 mole NaOH, and up to about 0.05 mole $Al_2O_3$.

16. The method of claim 15 wherein there is no organic template in said reaction mixture.

17. The method of claim 11 wherein step (b) comprises reacting said silica, sodium hydroxide and alumina hydrate at a pressure of about 50–360 psig without any organic template in the reaction mixture.

* * * * *